(12) United States Patent
Chhabria et al.

(10) Patent No.: US 12,010,182 B2
(45) Date of Patent: *Jun. 11, 2024

(54) SYSTEM AND METHODS FOR APPLICATION PROGRAMMING INTERFACE VALIDATION AND TESTING

(71) Applicant: Allstate Insurance Company, Northbrook, IL (US)

(72) Inventors: Reeta Chhabria, Arlington Heights, IL (US); Shruti Puranik, Palatine, IL (US); Sidhi Verdhan, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 66 days.

This patent is subject to a terminal disclaimer.

(21) Appl. No.: 17/859,099

(22) Filed: Jul. 7, 2022

(65) Prior Publication Data

US 2022/0417330 A1 Dec. 29, 2022

Related U.S. Application Data

(63) Continuation of application No. 17/355,501, filed on Jun. 23, 2021, now Pat. No. 11,418,624, which is a
(Continued)

(51) Int. Cl.
*G06F 15/173* (2006.01)
*G06F 9/54* (2006.01)
(Continued)

(52) U.S. Cl.
CPC ............ *H04L 67/133* (2022.05); *G06F 9/541* (2013.01); *G06F 9/547* (2013.01); *G06F 40/205* (2020.01); *H04L 41/0273* (2013.01); *H04L 67/01* (2022.05)

(58) Field of Classification Search
CPC ... H04L 67/133; H04L 67/01; H04L 41/0273; G06F 9/541; G06F 9/547
See application file for complete search history.

(56) References Cited

U.S. PATENT DOCUMENTS 7,016,800 B1 3/2006 Nguyen
7,490,319 B2 2/2009 Blackwell et al.
(Continued)

FOREIGN PATENT DOCUMENTS

CN 102968371 A 3/2013

OTHER PUBLICATIONS

Geethalaksmi Ramachandran, "5 Steps To Create REST API Component Test", http://technology.finra.org/code/5-steps-to-create-rest-api-component-test.html, retrieved on Jun. 21, 2018, 6 pages.
(Continued)

*Primary Examiner* — Wing F Chan
*Assistant Examiner* — Joseph R Maniwang
(74) *Attorney, Agent, or Firm* — Dinsmore & Shohl LLP

(57) ABSTRACT

Aspects of the disclosure relate to methods, computer-readable media, systems, and apparatuses for receiving data. An electronic computer implemented method of API testing and validation is provided. In the method, via a computer-based network, includes receiving a plurality of executable code requests for a first plurality of uniform resource network nodes associated with a first network protocol and a second plurality of uniform resource network nodes associated with a second network protocol. In the method each of the executable code requests are associated with a baseline attribute data value. Further, the method includes electronically receiving a plurality of payload response attribute data values associated with each executable request and electronically parsing the payload response attribute values with Parser component. The method includes electronically pro-
(Continued)

cessing the parsed payload response attribute values with Comparator component and mapping to each of the code requests associated with the baseline attribute value to generate a virtual hash map of key pairs.

20 Claims, 6 Drawing Sheets

Related U.S. Application Data continuation of application No. 16/241,390, filed on Jan. 7, 2019, now Pat. No. 11,050,850.

(51) Int. Cl.
*G06F 40/205* (2020.01)
*H04L 41/0273* (2022.01)
*H04L 67/01* (2022.01)
*H04L 67/133* (2022.01)

(56) References Cited

U.S. PATENT DOCUMENTS

| | | | |
|---|---|---|---|
| 8,413,230 | B2 | 4/2013 | Ohta et al. |
| 8,862,950 | B1 | 10/2014 | Ginsberg et al. |
| 8,863,087 | B2 | 10/2014 | Braverman et al. |
| 9,141,518 | B2 | 9/2015 | Bharadwaj et al. |
| 9,552,237 | B2 | 1/2017 | Biesack |
| 9,811,444 | B2 | 11/2017 | Freschl et al. |
| 2007/0168973 | A1 | 7/2007 | Crihfield |
| 2007/0277154 | A1 | 11/2007 | Badwe |
| 2014/0047342 | A1 | 2/2014 | Breternitz et al. |
| 2015/0128156 | A1 | 5/2015 | Zhu et al. |
| 2016/0147578 | A1 | 5/2016 | Biesack |
| 2017/0192879 | A1 | 7/2017 | Athinathan |

OTHER PUBLICATIONS

Riyadh Mahmood, "An Evolutionary Approach for System Testing of Android Applications, A dissertation submitted in partial fulfillment of the requirements for the degree of Doctor of Philosophy at George Mason University", Summer, 2015, 128 pages.

Lucia Gil, "Test automation for an API: Postman, Newman and Jenkins", https://solidgeargroup.com/test-automation-api, retrieved Jun. 20, 2018, 17 pages.

James Willett, "Going Further with Rest-Assured—Part 1: Writing and Using Test Data in your Framework", https://james-willett.com/2015/06/going-further-with-rest-assured-part-1-writing-and-using-test-data-in-your-framework/, Jun. 17, 2015, 12 pages.

Hari Charan, "Simple REST API Testing Framework", https://seleniumbycharan.wordpress.com/2016/07/13/simple-rest-api-testing-framework/, Jul. 13, 2016, 15 pages.

Prashant Hedge, "Master API Test Automation in 10 Minutes", https://blog.testproject.io/2016/06/22/master-api-test-automation/, Jun. 22, 2016, 11 pages.

Jun. 17, 2020—(U.S.) Non-Final Office Action—U.S. Appl. No. 16/241,390 (6591.1797).

Feb. 24, 2021—(U.S.) Notice of Allowance—U.S. Appl. No. 16/241,390 (006591.01797).

SYSTEM AND METHODS FOR APPLICATION PROGRAMMING INTERFACE VALIDATION AND TESTING

CROSS-REFERENCE TO RELATED APPLICATIONS

This application is a continuation of U.S. patent application Ser. No. 17/355,501, filed Jun. 23, 2021, which is a continuation of U.S. patent application Ser. No. 16/241,390, filed Jan. 7, 2019, which issued as U.S. Pat. No. 11,050,850 and is entitled "System and Methods for Application Programing Interface Validation and Testing," all of which are herein incorporated by reference in their entirety.

TECHNICAL FIELD

Aspects of the disclosure generally relate to one or more computer systems, servers, and or other devices including hardware and/or software. In particular, aspects are directed to application programming interface (API) validation and testing.

BACKGROUND

An application programming interface (API) connects a computer program to a programming library. Moore's law predicted that the number of transistors on a computer chip would double every two years while the chip's price would remain constant. "Moore's law" meant consumers could buy the same technology two years later for about the same price. Fifty years later, Moore's law prediction has endured to the idea that technology companies have recognized Moore's law as a benchmark they must meet, or fall behind in the market. Patrons have come to expect technological products to be faster, cheaper, and more compact over time. This expectation seems to have driven trends of rapid growth in computing power, smaller devices, the ability to connect to the Internet, and reduction in cost and big data. There is a need to improve the technological processing in the new computing era including APIs.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, systems, and apparatuses for receiving data. In one aspect, an electronic computer implemented method of application programming interface testing and validation is provided. The method includes, via a computer-based network, receiving a plurality of executable code requests for a first plurality of uniform resource network nodes associated on a first network protocol and a second plurality of uniform resource network nodes associated on a second network protocol. In the method each of the executable code requests are associated with a baseline attribute data value. Further, the method includes electronically receiving a plurality of payload response attribute data values associated with each executable request and electronically parsing the payload response attribute values with a Parser component. The method includes electronically processing the parsed payload response attribute values with a Comparator component and mapping to each of the code requests associated with the baseline attribute value to generate a virtual hash map of key pairs.

These and other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
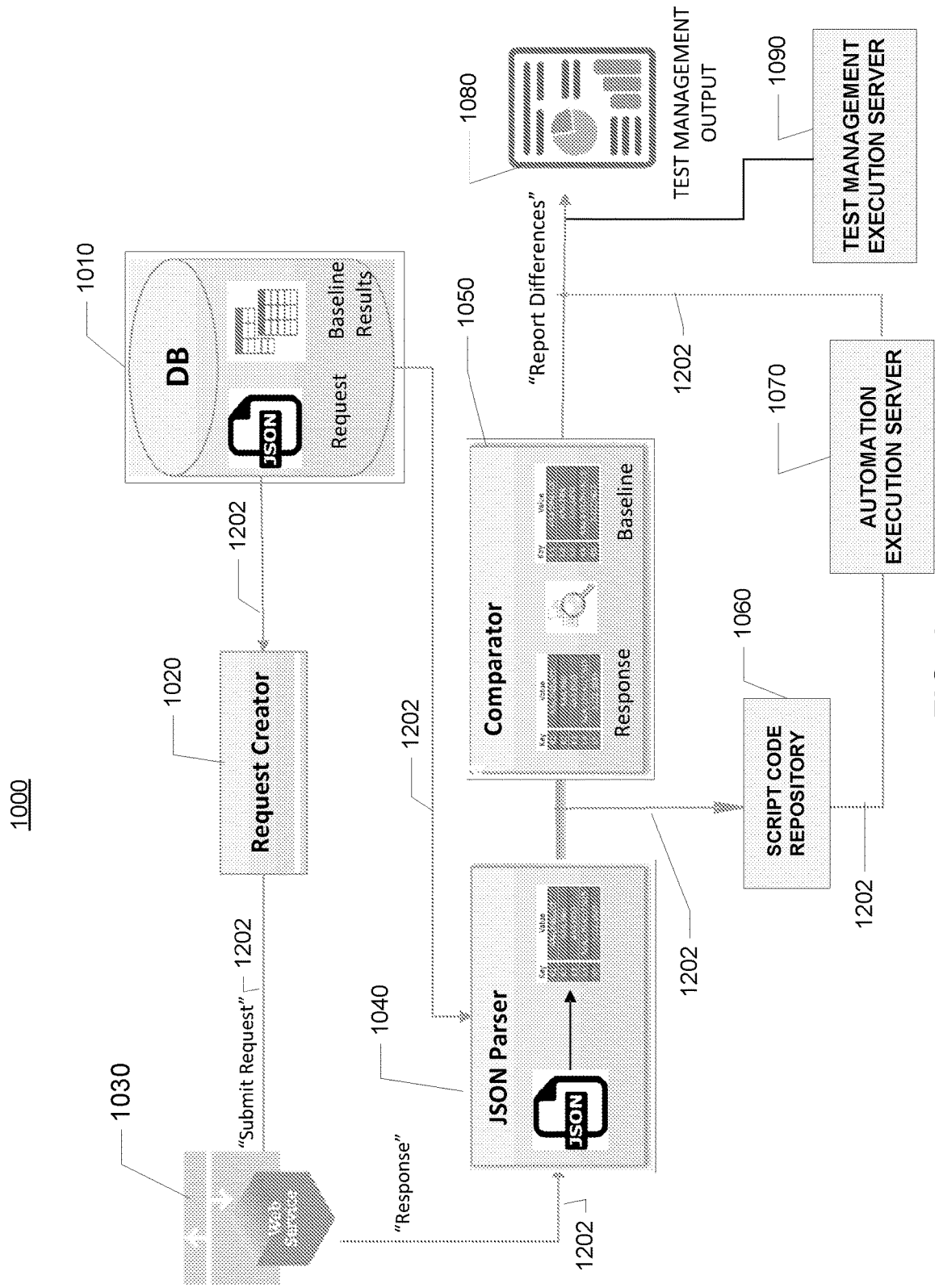
FIG. 1 illustrates a schematic diagram of a digital computing environment in which certain aspects of the present disclosure may be implemented.

FIG. 1 depicts an environment 1000 including illustrative servers, computing devices, and the like, for performing various functions for API validation and testing, and the like, according to one or more aspects described herein. The disclosure may be described in the context of computer-executable instructions, such as program modules, being executed by a computer. Generally, program modules include routines, programs, objects, components, schema, data structures, etc. that perform particular tasks or implement particular computer data types. The disclosure may also be practiced in distributed computing environments where tasks are performed by remote processing devices that are linked through a communications network. In a distributed computing environment, program modules may be located in both local and remote computer storage media including memory storage devices.

As referred to herein "attribute data", "expected values", or "baseline values" may include ASCII characters in computer readable form or binary complied data. The ASCII characters or binary data can be manipulated in the software of system 1000. An API enables communication and data exchange between two separate software systems. A software system implementing an API contains functions/subroutines which can be executed by another software system. API denotes an Application Programming Interface. The systems and methods of the present disclosure can be implemented in various technological computing environments including Simple Object Access Protocol (SOAP) or in the Representational State Transfer (REST). REST is the software architectural style of the World Wide Web. REST APIs are networked APIs that can be published to allow diverse clients, such as mobile applications, to integrate with the organizations software services and content. Many commonly-used applications work using REST APIs as understood by a person of skill in the art. A REST API call includes an HTTP verb (e.g., GET, POST, PUT, DELETE, HEAD, PATCH), a uniform resource locator (URL) or uniform response Indicator (URI) of a resource, an optional request body (data or content to pass to the API), and HTTP headers that provide options or parameters for the API call.

In a configuration in the present disclosure, there is provided a dynamic and configurable API Testing and Validation System 1000 to efficiently test software releases that use web/HTTP computer services using SOAP or REST environments, individually or in parallel, which are called upon by multiple computing applications. The services that feed into many different software applications may be updated, but can be tested to ensure compatibility with different applications in live situations. In particular using the API Testing Tool 1000, baseline data expected results are stored in a computer readable database. A script (such as in JAVA in JavaScript Object Notation—"JSON") may be created having the data parameters being tested to determine if the expected results are produced. The baselined Response JSON/XML script is stored in a database. A request is forwarded to web server and live response JSON/XML is received. For each data parameter being tested, the live response received from the web server and a stored baselined expected response is parsed and key value pairs are stored in a virtual hash map. The stored key value pairs in the virtual hash map are compared. The comparison is done between the nodes of stored baselined Response and the Live Response received from web server. Differences from the comparison are reported in a computer readable system.

Aspects of the present disclosure provide for advantages in technological API testing and validations, such as reduced regression cycle time to complete testing. Previously, large responses needed to be traversed to look for nodes of actual values for performing assertions manually. The API testing and validation automation solution of the present disclosure reduces time to complete validations with accuracy and efficiency, including reducing computer processor overhead. In another advantage, the API testing and validation automation solution provides ease of use as it need only to update data in the database without any modification to the script code which is automated. Further, the API testing and validation automation solution of the present disclosure reduces total execution time, by performing parallel execution of SOAP/XML and/or REST/JSON web services using at least an automation server and dynamic code executions.

Referring to FIG. 1, Database (DB 1010) includes a plurality of computer readable records in a relational database management system for API testing and validation. The components of System 1000 are connected by one or more communications links 1202. The database DB 1010 could be any number of commercially available systems, such as Oracle, MS Access, Sybase, Informix, Postgres, and other database systems. In this database 1010, data is stored for baselined Request/Response JSON's/XML's, nodes that need to be compared and validated and their respective JSON/XML paths. A Request Creator 1020 is provided to consolidate metadata (Header, URI, etc.) to build the JSON Request (Executable Code Request). The specific features and operation of Request Creator 1020 is provided in the process steps in conjunction with FIG. 4. Web services 1030 are the live environments in which the application programs and APIs operate. Web services 1030 can be provided in SOAP or REST frameworks or others. Parser 1040 receives the live Response JSON/XML, from the web service web server 1030 and parses the actual result and stores the key value pairs in a virtual hash map. Comparator 1050 is provided for stored key value pairs in a hash map to compare with the expected result stored in database 1010.

A detailed comparison report 1080 is generated from the Comparator component 1050. API Testing and Validation Tool 1000 includes a Script Code Repository (SCR). One suitable example of a code repository is the commercially available GITHUB product. The Code is checked-in to Script Code Repository (SCR). In one or more arrangements, automation execution server 1070 pulls the script code from the Script Code Repository 1060 and executes test cases to generate the computer readable test management output 1080 which could be in the form of flat database file of rows/columns, spreadsheet and the like. Suitable commercially available examples of an automation execution server 1070 include the Jenkins open source platform and others. In additionally, Test management execution server 1090 is configured to automatically receive the status of test execution in a computer readable database for Test Management. Suitable commercially available examples of a Test management execution server 1090 include Zephyr/Jira cloud-based platform and others.

Figure 3:
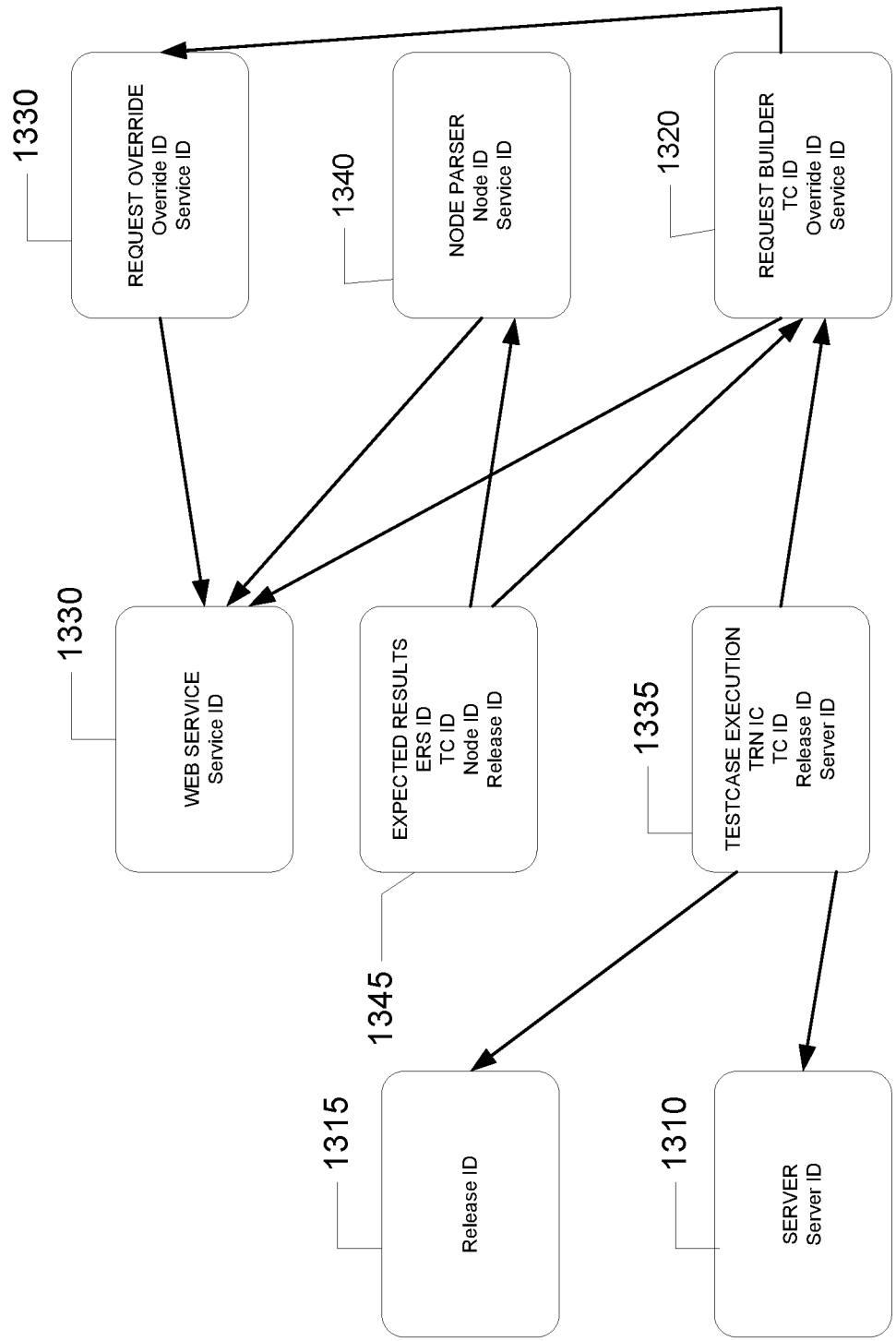
FIG. 3 illustrates a block diagram of database configurable components and relationships in which certain aspects of the present disclosure may be implemented.

Referring to FIG. 3, various components of the API Testing and Validation system 1000 may be configurable in or with database DB 1010. Server component 1310 with the server ID may be configurable and linked with TestCase Execution component 1335 having TestCase ID (TC ID), Release ID, and Server ID. TestCase Execution component 1335 may be configurable and linked with Release ID 1315. Expected Results component 1345 having TestCase ID, Release ID, and Node ID may be configurable and link with Node Parser component 1340. Node Parser component 1340 has relational linkage via a Node ID, and Service ID. Web Service component 1330 having Service ID may be configurable and linked with Node Parser 1340 and Request Builder component 1320. Request Builder component 1320 has relational linkage via TC ID, and override ID. Request Builder component 1320 has configurable linkage to Request Override component 1350. Request Override component 1330 has configurable linkage to the Service component 1330. The Request Override component 1350 will enable the user to override the baselined request with customized attribute values based on the test case.

Figure 4:
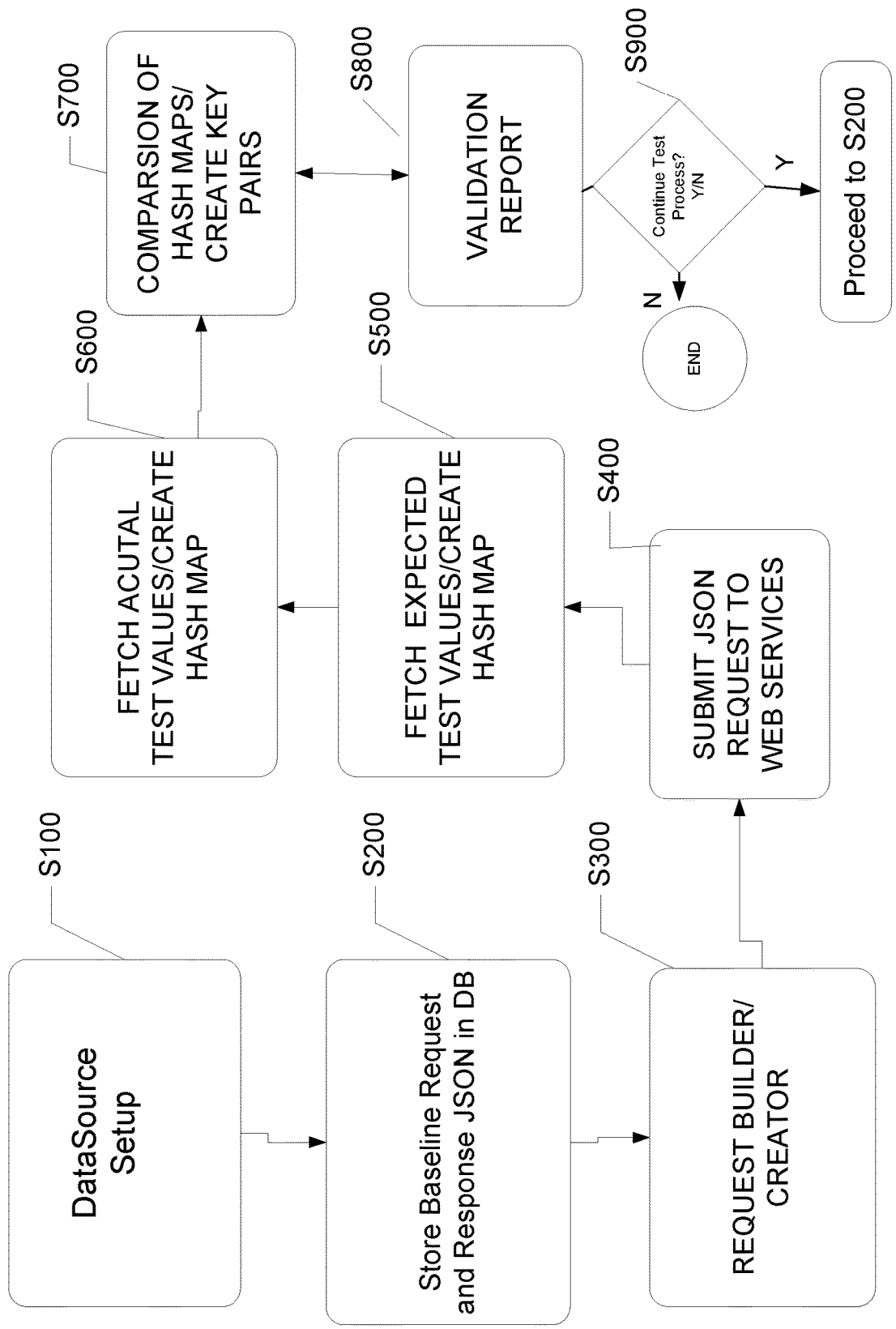
FIG. 4 illustrates a process flow of components in which certain aspects of the present disclosure may be implemented.
Figure 6:
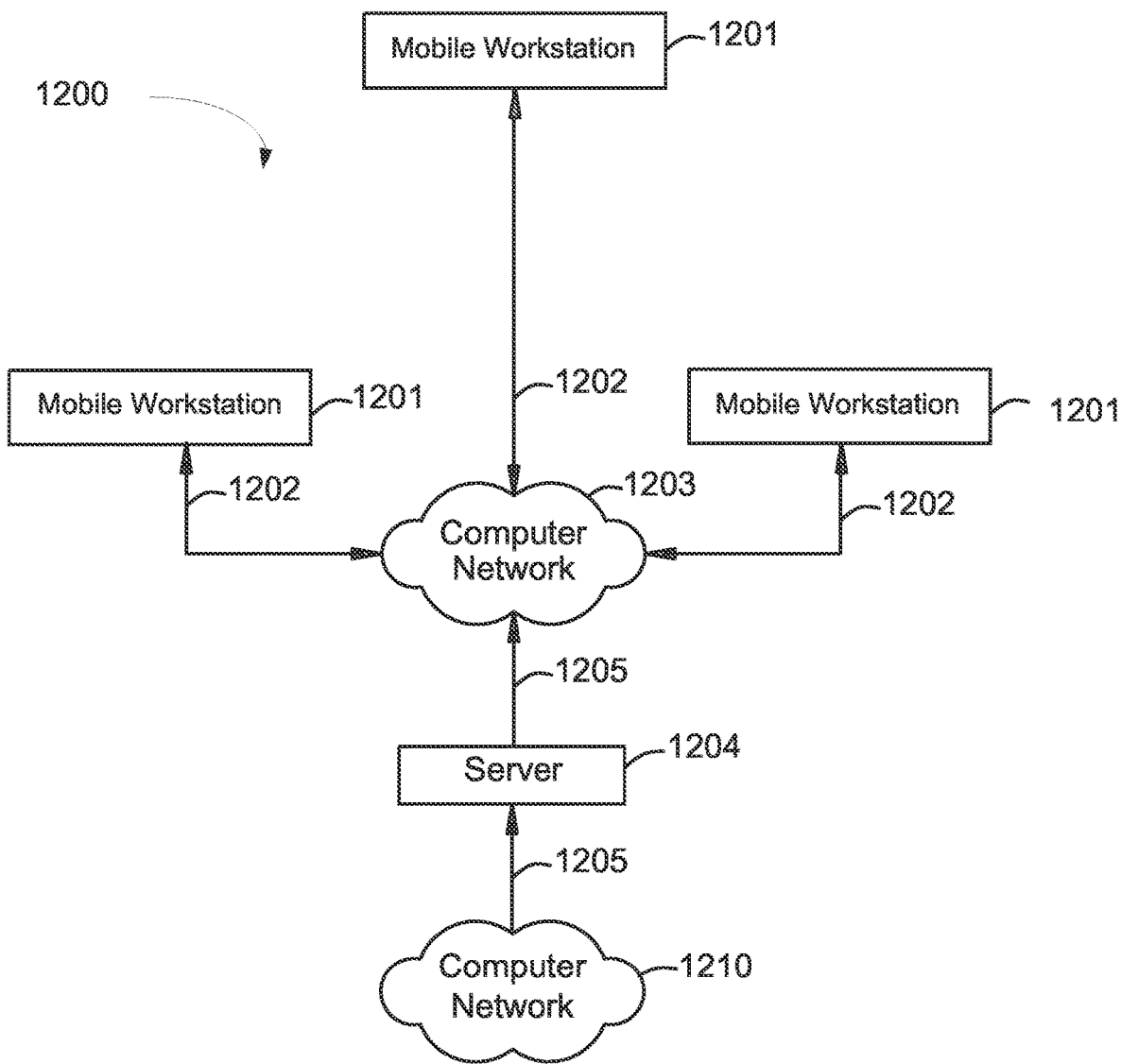
FIG. 6 is an illustrative block diagram of mobile workstations and stationary workstations and servers that may be used to implement the processes and functions of certain embodiments of the present disclosure.

The steps in the process that follow in FIG. 4 can be implemented to include a computer readable transaction history or log of the status within process flows that can be maintained or otherwise stored within a memory/database, such as memory 1115 (database 1121) and/or RAM 1105 in FIG. 6. In Step S100, the test case parameters data is populated for the expected results (e.g., baseline results). The test case parameters are created for the script service to be tested or validated. Data may be stored in Database (DB 1010) for the request XML/JSONs and baseline responses/results. Further in Step S100, the API testing/validation tool 1000 retrieves or fetches the saved baseline response JSON (e.g., script for testing) for a test case from REQUEST_BUILDER data file and response data and parses the baseline response JSON expected test values. Then, in Step S100, the process inserts the expected test values in an EXPECTED RESULT database flat file table used for comparison testing and validation at a later step (for example, Step S600-S700). In one implementation, Groovy scripting language may be used to create the testing script.

In Step S200, the API testing and validation tool 1000 establishes a data source for the baseline request and response JSONs for fetching values from various computer readable data files based on a SQL query. For example, the API Testing Tool 1000 may store the one of more baseline requests and expected response values in a computer readable REQUEST_BUILDER table (for example, storing the baseline JSONs) for a test case.

In Step S300, a node (e.g., URI or URL) in the computer network 1131, 1203 is parameterized for testing such that the stored values for each node is retrieved and populated in the parameterized URI. The header values are also parameterized. The API Testing Tool Groovy script sets the values for the URI endpoint, Request and Header. In this way, API Testing tool 1000 consolidates metadata (Header, URI, etc.) to build JSON Request to web services. Further, this parameterized feature provides ease of use as only the attribute data in the database can be updated for the testing validation. In one example, if an web service uses a "line-of-business" input attribute value, the Header value (e.g., "line-of-business" parameter) changes depending on the testcase which is configured in the REQUEST_BUILDER data file. In another example, the node path can also be parameterized. For example, a node (URI) or endpoint URI, such as "MsgStatusCd" can be parameterized for the path below:

{ServiceName}[0].MessageMappings.
MessageMappings{Messages[0].MsgStatus-Cd.SrcCd}

In Step S400, JSON request of the API testing Tool 1000 is sent to the web services (REST framework environment) in the network environment for live real-time testing for the services (e.g., web services at an URI or URL). In one construction API Test and Validation Tool 1000, performs parallel execution of the both SOAP/XML and REST/JSON web services. Alternatively, in one construction, API Test and Validation Tool 1000 performs execution of SOAP/XML web services. In yet another construction, API Test and Validation Tool 1000, execution REST/JSON web services. This step can be considered a REST Request or SOAP Request or in the case of parallel execution—a SOAP/REST Request. In this step, the API testing tool sends the Request JSON to the endpoint (URI) and receives a live response value for each unique service under testing for a test case.

The process flows to the Step S500, the API Testing Tool retrieves the expected values (baseline data values) for a test case using a SQL query. The SQL query retrieves attribute data from at least two computer readable tables returned and stores on the database a RESPONSE_NODE_PARSER and EXPECTED_RESULT. Only the expected attribute data values from EXPECTED_RESULT are stored in an Expected Result Hash Map H100. Hash Map H100 includes a unique one-to-one mapping linking of the tested nodes URI, including the node path and expected results thereof.

Figure 2:
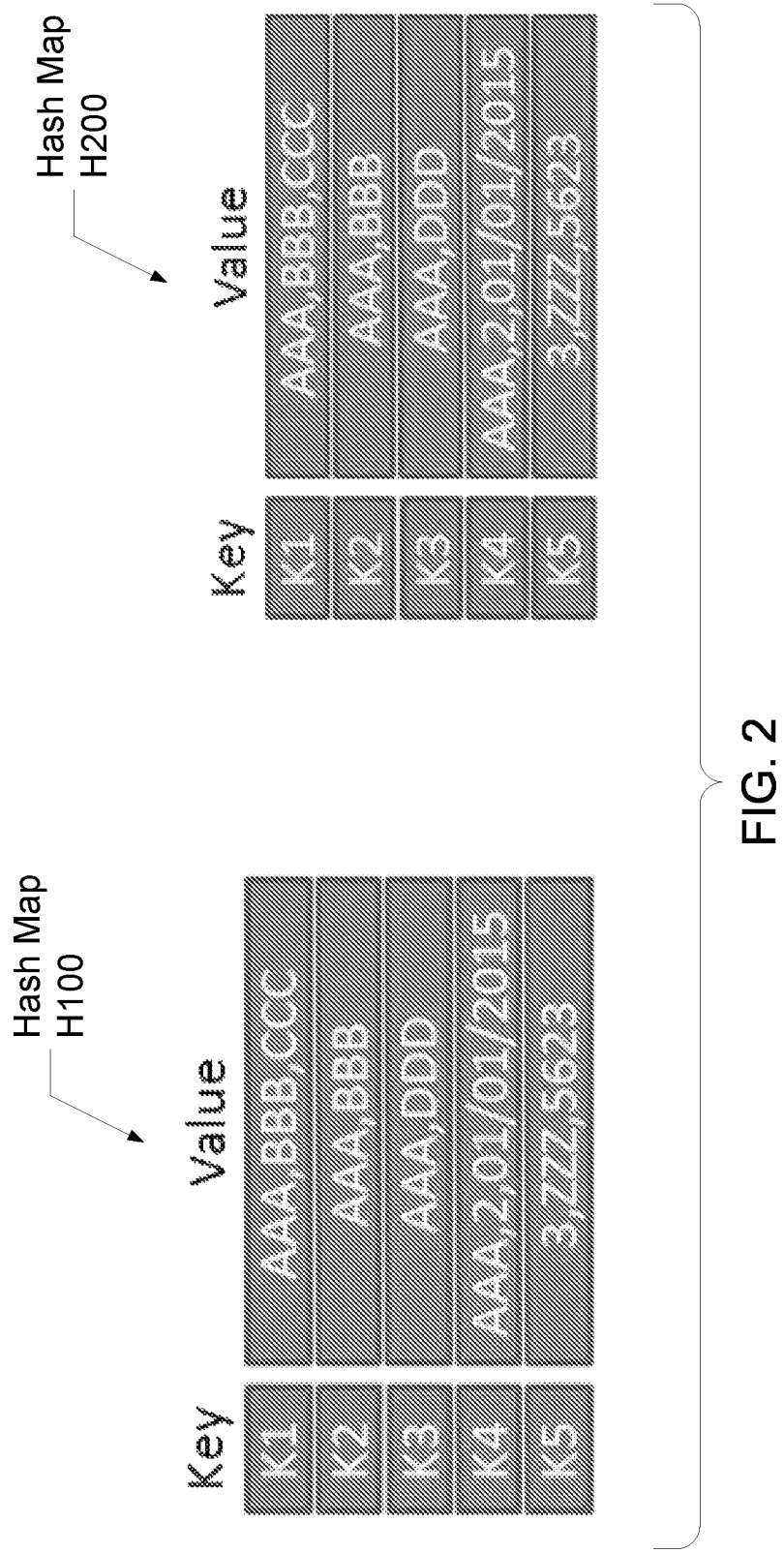
FIG. 2 illustrates a block diagram of a comparison testing computer readable framework in which certain aspects of the present disclosure may be implemented.

In Step S600, the API Testing Tool retrieves the payload including actual data values from a live real-time response and stores it in a Hash Map H200. The live actual values from lives responses are located using node name, node path, child node combination given in RESPONSE_NODE_PARSER and EXPECTED_RESULT. The live actual values are stored in an Actual Results Hash Map H200 (shown in FIG. 2). Hash Map H200 includes a unique one-to-one mapping link of the tested nodes URI and the stored live actual results thereof.

In Step S700, the API Testing Tool compares the Expected Result Hash Map H100 (shown in FIG. 2) and Actual Results Hash Map H200 by comparing each node (URI) expected values for a test case to the actual values from the live response JSON. Key value pairs are created from the differences in the expected value and actual value for each node as required. The key value pairs are stored in computer readable memory and a detailed report (Step S800) listing is created, including the node path. In Step S900, depending on the automatic parameters for the testing and validation, the process determines whether to continue or end. If the process is completed then the process ends. If the system 1000 is configured to test additional APIs, then the API Testing Tool loops through Steps S200-S900 repeated from each test case configured in the Data Source Step S100. It is noted in FIGS. 1-6, that each of the elements of the aforementioned embodiments may be utilized alone or in combination or sub-combination with elements of the other embodiments.

In one alternative construction, the steps in the FIG. 4 can be implemented where the mobile devices can receive inquiries, via an automatic push notification or a report that sends to the authorized inquirer an electronic mail, text messaging via Short Messaging Service (SMS) component of phone, web, or mobile communication systems, using standardized communication protocols that allow the exchange of short text messages between fixed line or mobile phone devices. In another manner, the mobile device may receive inquiries via a pull format where the inquirer initiates the query at various steps and the notification can be electronic mail or Short Messaging Service technology for cellular phones.

Aspects of the present disclosure provide for advantages in technological API testing and validation, such as improved test coverage by reduced time to market releases and testing cost that can help in accommodating additional tests to improve test coverage. Automation script supports validation of SOAP/REST framework web services and supports validation across different schemas, test environments across multiple software releases and API versions (See FIG. 3). In other advantages auto population of expected results by parsing the baseline Response JSON/XML files stored in database reduces computer processor overhead time and nodes to be validated in that the response are configurable separately.

The disclosure may be described in the context of computer-executable instructions, such as program modules, being executed by a computer. Generally, program modules include routines, programs, objects, components, data structures, etc. that perform particular tasks or implement particular computer data types. The disclosure may also be practiced in distributed computing environments where tasks are performed by remote processing devices that are linked through a communications network. In a distributed computing environment, program modules may be located in both local and remote computer storage media including memory storage devices.

Figure 5:
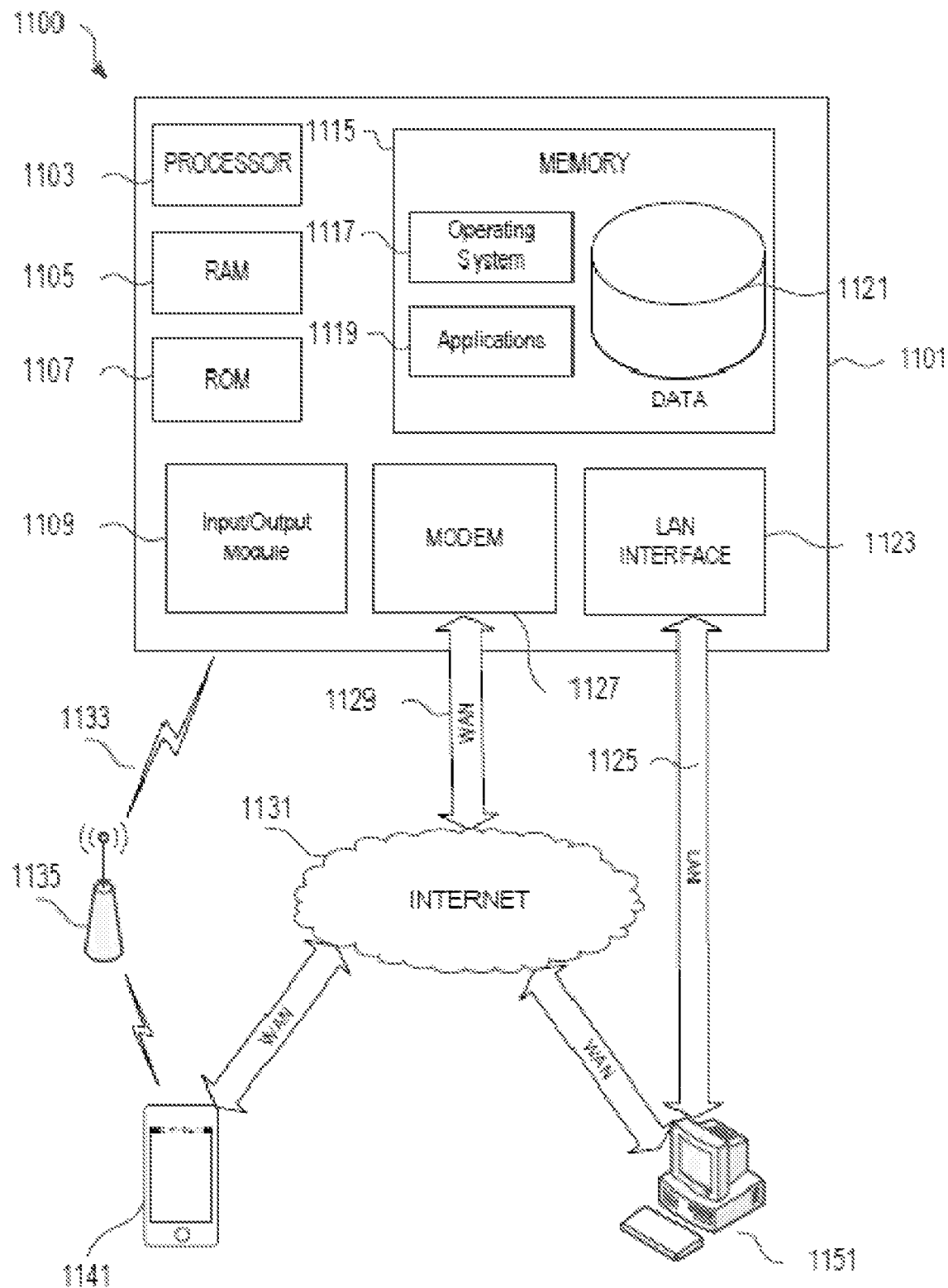
FIG. 5 illustrates a network environment and computing systems that may be used to implement aspects of the disclosure.

FIG. 5 illustrates a block diagram of a computing device 1101 in API Testing and Validation System 1100 that may be used according to one or more illustrative embodiments of the disclosure. The API Testing and Validation Tool/Device 1101 may have a processor 1103 for controlling overall operation of the device 1101 and its associated components, including RAM 1105, ROM 1107, input/output module 1109, and memory 1115. The computing device 1101, along with one or more additional devices (e.g., terminals 1141, 1151) may correspond to any of multiple systems or devices.

Input/Output (I/O) 1109 may include a microphone, keypad, touch screen, and/or stylus through which a user of the computing device 1101 may provide input, and may also include one or more of a speaker for providing audio output and a video display device for providing textual, audiovisual and/or graphical output. Software may be stored within memory 1115 and/or storage to provide instructions to processor 1103 for enabling device 1101 to perform various functions. For example, memory 1115 may store software used by the device 1101, such as an operating system 1117, application programs 1119, and an associated internal database 1121. Processor 1103 and its associated components may allow the API Testing and Validation System 1100 to execute a series of computer-readable instructions. t.

The computing device 1101 may operate in a networked environment 1100 supporting connections to one or more remote computers, such as terminals/devices 1141 and 1151. The network connections depicted in FIG. 5 include a local area network (LAN) 1125 and a wide area network (WAN) 1129, and a wireless telecommunications network 1133, but may also include other networks. When used in a LAN networking environment, the computing device 1101 may be connected to the LAN 1125 through a network interface or adapter 1123. When used in a WAN networking environment, the device 1101 may include a modem 1127 or other means for establishing communications over the WAN 1129, such as network 1131 (e.g., the Internet). When used in a wireless telecommunications network 1133, the device 1101 may include one or more transceivers, digital signal processors, and additional circuitry and software for communicating with wireless computing devices 1141 (e.g., mobile phones, tablet computers) via one or more network devices 1135 (e.g., base transceiver stations) in the wireless network 1133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and driving analysis system components described herein may be configured to communicate using any of these network protocols or technologies.

Referring to FIG. 6, an illustrative system 1200 for implementing API Testing and Validation System 1000 and methods according to the present disclosure are shown. As illustrated, system 1200 may include one or more mobile workstations 1201. Mobile workstations 1201 may be local or remote, and are connected by one or more communications links 1202 to computer networks 1203, 1210 that is linked via communications links 1205 to server 204. In system 1200, server 1204 may be any suitable server, processor, computer, or data processing device, or combination of the same. Computer network 1203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 1202 and 1205 may be any communications links suitable for communicating between workstations 1201 and server 1204, such as network links, dial-up links, wireless links, hard-wired links, etc.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. An electronic computer implemented method of application programming interface (API) testing and validation, comprising:
   electronically receiving a plurality of payload response attribute data values associated with each of a plurality of executable code requests for a plurality of uniform resource network nodes;
   electronically generating a first virtual hash map comprising a mapping between each of the plurality of payload response attribute data values and each of the plurality of executable code requests;
   comparing nodes of the first virtual hash map to nodes of a second virtual hash map; and
   generating, based on the comparing, differences between an expected value and an actual value for each node.

2. The method of claim 1, wherein each of the executable code requests is associated with a baseline attribute data value.

3. The method of claim 1, wherein one or more of the plurality of uniform resource network nodes are associated with Simple Object Access Protocol (SOAP) or Representational State Transfer (REST) protocol.

4. The method of claim 1, wherein a comparing of a first node of the first virtual hash map to a second node of the second virtual hash map generates a difference between the first node and the second node.

5. The method of claim 4, further comprising:
   creating a key value pair based on the difference.

6. The method of claim 5, wherein the key value pair comprises a node path.

7. The method of claim 4, wherein the comparing further comprises comparing the nodes of a stored baselined response and a response received from a server.

8. The method of claim 7, further comprising parameterizing each node for testing the response.

9. One or more non-transitory computer readable media storing computer executable instructions that, when executed by at least one processor, cause the at least one processor to perform a method of application programming interface (API) testing and validation, comprising:

electronically receiving a plurality of payload response attribute data values associated with each of a plurality of executable code requests for a plurality of uniform resource network nodes;

electronically generating a first virtual hash map comprising a mapping between each of the plurality of payload response attribute data values and each of the plurality of executable code requests;

comparing the first virtual hash map to a second virtual hash map; and generating, based on the comparing, a testing report.

10. The one or more non-transitory computer readable media of claim 9, wherein one or more of the plurality of uniform resource network nodes are associated with Simple Object Access Protocol (SOAP) or Representational State Transfer (REST) protocol.

11. The one or more non-transitory computer readable media of claim 9, wherein each of the executable code requests is associated with a baseline attribute data value.

12. The one or more non-transitory computer readable media of claim 9, wherein the comparing the first virtual hash map to the second virtual hash map comprises comparing nodes of the first virtual hash map to nodes of the second virtual hash map, and wherein a comparing of a first node of the first virtual hash map to a second node of the second virtual hash map generates a difference between the first node and the second node.

13. The one or more non-transitory computer readable media of claim 12, further comprising:

storing computer executable instructions that, when executed by at least one processor, cause the at least one processor to create a key value pair based on the difference.

14. The one or more non-transitory computer readable media of claim 13, wherein the testing report comprises the key value pair.

15. The one or more non-transitory computer readable media of claim 12, wherein the testing report comprises the difference between the first node and the second node.

16. The one or more non-transitory computer readable media of claim 15, further comprising:

storing computer executable instructions that, when executed by at least one processor, cause the at least one processor to electronically store the first virtual hash map.

17. An apparatus comprising:

one or more processors; and memory storing instructions that, when executed by the one or more processors, cause the apparatus to:

electronically receive a plurality of payload response attribute data values associated with each of a plurality of executable code requests for a plurality of uniform resource network nodes;

electronically parse the plurality of payload response attribute data values; and electronically generate a first virtual hash map comprising a mapping between each of the plurality of payload response attribute data values and each of the plurality of executable code requests.

18. The apparatus of claim 17, wherein one or more of the plurality of uniform resource network nodes are associated with Simple Object Access Protocol (SOAP) or Representational State Transfer (REST) protocol.

19. The apparatus of claim 17, wherein the memory storing instructions, when executed by the one or more processors, further cause the apparatus to compare the first virtual hash map to a second virtual hash map.

20. The apparatus of claim 19, wherein the memory storing instructions, when executed by the one or more processors, further cause the apparatus to:

cause the one or more processors to store a key value pair based on the difference.

\* \* \* \* \*